US012667128B2

(12) United States Patent
Toledo E Silva et al.

(10) Patent No.: US 12,667,128 B2
(45) Date of Patent: Jun. 30, 2026

(54) DIETARY FIBER PREPARATION FROM MACAUBA FRUIT, AND METHOD OF PRODUCING SAME

(71) Applicants: Fraunhofer-Gesellschaft zur Foerderung der angewandten Forschung e.V., Munich (DE); Instituto de Tecnologia de Alimentos (ITAL), Chacaras (BR); Instituto Agronomico Campinas IAC, Campinas (BR)

(72) Inventors: Sergio Henrique Toledo E Silva, Chacaras Campos dos Amarais (BR); Gabriele Doer, Freising (DE); Peter Eisner, Freising (DE); Stefanie Mittermaier, Freising (DE); Isabel Muranyi, Freising (DE); Roseli Aparecida Ferrari, Chacaras Campos dos Amarais (BR); Alexandre Martins Moreira, Chacaras Campos dos Amarais (BR); Lidiane Bataglia Da Silva, Chacaras Campos dos Amarais (BR); Carlos Colombo, Chacaras Campos dos Amarais (BR)

(73) Assignees: Fraunhofer-Gesellschaft zur Förderung der angewandten Forschung e.V., Munich (DE); Instituto de Tecnologia de Alimentos (ITAL), Chácaras Campos dos Amarais (BR); INSTITUTO AGRONOMICO CAMPINAS JAC, Campinas (BR)

( * ) Notice: Subject to any disclaimer, the term of this patent is extended or adjusted under 35 U.S.C. 154(b) by 181 days.

(21) Appl. No.: 18/574,963

(22) PCT Filed: Jun. 28, 2022

(86) PCT No.: PCT/EP2022/067694
§ 371 (c)(1),
(2) Date: Dec. 28, 2023

(87) PCT Pub. No.: WO2023/275026
PCT Pub. Date: Jan. 5, 2023

(65) Prior Publication Data
US 2024/0315302 A1 Sep. 26, 2024

(30) Foreign Application Priority Data
Jun. 30, 2021 (DE) .......................... 102021116922.4

(51) Int. Cl.
| | |
|---|---|
| *A23L 33/24* | (2016.01) |
| *A23L 29/262* | (2016.01) |
| *A23L 33/185* | (2016.01) |
| *A23L 33/22* | (2016.01) |

(52) U.S. Cl.
CPC ............. *A23L 33/24* (2016.08); *A23L 29/262* (2016.08); *A23L 33/185* (2016.08); *A23L 33/22* (2016.08)

(58) Field of Classification Search
CPC ............................... A23L 33/24; A23L 29/262
See application file for complete search history.

(56) References Cited

U.S. PATENT DOCUMENTS

2013/0247451 A1* 9/2013 Vanhercke ................ C11B 3/14
554/20

OTHER PUBLICATIONS

Cardoso Coimbra et al., "Characterization of the Pulp and Kernel Olls from Syagrus oleracea, Syagrus romanzoffiana, and Acromcomia aculeata", Journal of Food Science, vol. 76, Nr. 8, (2011), pp. C1156-C1161). (Year: 2011).*

(Continued)

*Primary Examiner* — Elizabeth Gwartney
(74) *Attorney, Agent, or Firm* — Renner, Kenner, Greive, Bobak, Taylor & Weber Co. LPA

(57) ABSTRACT
The invention relates to a dietary fiber preparation and to a method for producing same. The dietary fiber preparation is (Continued)

produced from the flesh of macauba fruit and has a dietary fiber content of more than 25% by mass, preferably more than 30% by mass, a fat content of less than 20% by mass, preferably less than 10% by mass, a water content of less than 20% by mass, preferably less than 15% by mass, and a bright colour having an L* value, measured by CIE-L*a*b* colourimetry, of more than 84, preferably more than 90. The preparation is characterized in that the alcohol-water-soluble substance content in the dietary fiber preparation is less than 40% relative to the mass of the preparation. The preparation has good technofunctional and sensory properties, is suitable for foodstuffs, cosmetics, pet food and technical applications and can be produced at low cost and without chemical modification.

12 Claims, 2 Drawing Sheets

(56)                References Cited

OTHER PUBLICATIONS

Andrade Amanda Cristina et al.: "Preboitic potential of pulp and kernel cake from Jeriva (*Syagrus romanzoffiana*) and Macauba palm fruits (*Acrocomia aculeata*)", Food Research International, Amsterdam, NL, vol. 136, p. 109595 (Oct. 1, 2020).

Michelle Cardoso Coimbra et al: "Proximate composition of guariroba, jeriva and macauba palm fruits", Food Research International, Elsevier, Amsterdam, NL, vol. 44, No. 7, pp. 2139-2142 (Mar. 12, 2011).

Carlos Augusto Colombo et al: "Macauba: a promising tropical palm for the production of vegetable oil", OCL Oilseeds & Fats Crops and Lipids, 25(1), D108 (2018).

Alessandra Oliveira Da Silva et al.: "Development and characterization of biopolymer films based on bocaiuva (*Acromonia aculeata*) flour", International Journal of Biological Macromolecules, Elsevier 155 pp. 1157-1168 (2020).

Sayeny de Ávila Gonçalves et al: "Physical-chemical evaluation of flours from brewery and macauba residues and their uses in the elaboration of cookies", Journal of Food Processing and Preservation, 45, e15700 (2021).

Caroline Portilho Trentini et al: "Low-pressure solvent extraction of oil from macauba (*Acrocomia aculeata*) pulp: characterization of oil and defatted meal", Ciência Rural, Santa Maria, v.46, n.4, p. 725-731, abr, (2016).

* cited by examiner

DIETARY FIBER PREPARATION FROM MACAUBA FRUIT, AND METHOD OF PRODUCING SAME

The invention relates to functional dietary fibre preparations from macauba fruit, in particular for food, cosmetics, pet food and technical applications, and a method for producing said preparations.

PRIOR ART

Dietary fibres consist mainly of polysaccharides of the plant cell wall (PCW) and lignin. Pectins, hemicellulose and cellulose are key components of the plant cell wall, and are present in varying proportions according to the plant species. They comprise a variety of polysaccharide groups, such as galacturonans, arabinans, xylans, mannans, xyloglucans and β-glucans [1-3]. The structural variety engendered by the monosaccharide composition, the bond types and patterns, the chain form and the degree of polymerisation and substitution defines the specific properties of cell wall polysaccharides.

Natural dietary fibres and thickeners are becoming more and more important for human and pet foods as well as for use in technical applications. The increasing demand for nutritionally effective dietary fibres, thickeners, technical fibres and raw materials for biobased polymers and packaging materials has led to a growing need for dietary fibre preparations which can be made provided simply and inexpensively, which are not chemically modified, and whose production does not entail excessive consumption of resources. With the exception of a small number of dietary fibre preparations from cereals or legumes, many natural dietary fibres do not have good functional properties for foodstuffs or for use in technical applications.

Functional dietary fibre preparations according to the prior art with thickening, emulsifying or foaming and gelling properties in aqueous solution or suspension can be obtained for example from wood, algae, or from microorganisms. Examples of such high-value preparations include, among others, carboxymethyl cellulose, carrageen, alginate or xanthan. Depending on the raw material, pH and temperature, they each have specific rheological properties in mixtures with water, form gels upon heating, or they can be used in the form of films, or they can be shaped as injection moulded parts, and consequently used for example as substitutes for petroleum-based plastics for applications. However, these dietary fibre preparations require complex processing and/or modification, which means that high production costs arise, and they also consume many resources because of the extensive processing steps.

This opens up a high potential for processing residues, which are created for example when producing vegetable oil. Previously, these fractions from oil plants have been mainly used as fertiliser or in animal feed. Due to the presence of antinutritional co-ingredients, in most cases they have only little value for animal nutrition. Residues from seeds such as rapeseed, sunflower or flax still contain quantities of shell and phytochemicals as well as dietary fibre after the oil has been removed. The resulting dark colour, unpleasantly bitter, astringent or grassy taste and in some cases the large quantity of antinutritional components such as phenolic acids, cyanogenic glycosides, glucosinulates, oligosaccharides and other substances render most residues from vegetable oil production unusable for use in human food, for pet food, and because of the colour also for many technical applications.

In this context, residues from the process of recovering oil from macauba fruit (*Acrocomia* ssp.) may also be used as a possible source of dietary fibre preparations, as described in this invention.

Macauba is a species of palm native to tropical and subtropical America. The fruits of the plant consist of an outer shell (epicarp), an oil and fibre-rich flesh (pulp), an inner shell (endocarp) and a kernel. The oil from the pulp is obtained by mechanical pressing and by solvent extraction [4, 5], and is mainly used for biofuel production, and the de-oiled, fibre-rich pulp is left over. This byproduct, which makes up about 25% of the total weight of the fruit, is currently used as animal feed or discarded [7].

The potential for applications with food despite the fact that the pulp has barely been used in the past was described earlier. Full fat macauba pulp flour has been used in foods such as biscuits, cupcakes, probiotic beverages, muesli bars, cakes and ice cream. However, the high oil content of the pulp flour limits its use as an ingredient for the food industry, particularly due to oil oxidation and the development of products of oxidation with unpleasant sensory properties. In contrast to this, the object of the present invention is to develop dietary fibre preparations with high functionality and good sensory characteristics. It was not known until now whether this is possible.

The prior art holds scant information about the suitability of macauba pulp for technical and biotechnological applications. Biodegradable films made with de-oiled macauba pulp flour were produced by da Silva et al. [6]. In this work the de-oiled flour was dispersed in water, mixed with glycerin as a plasticiser and poured into petri dishes to create the biofilms. The biofilms obtained were yellowish in colour and opaque, but these are undesirable properties for films.

The prior art also describes the use of pressing and solvent extraction methods for processing macauba pulp. Pressing methods include continuous pressing or discontinuous hydraulic pressing while various solvents such as hexane, ethyl acetate, acetone, methanol, ethanol and isopropanol can be used [4, 5, 6]. However, it is not clear from these publications how the specific treatment affects the composition and functional properties of the residues. Thus, Trentini at al. [5] describe the treatment of macauba pulp with various solvents (ethyl acetate, n-hexane and isopropanol). According to the authors, neither the composition nor the functionality of the de-oiled pulp is affected by the different solvents used. Moreover, the effects of such processes on key components for the improvement of the functional and sensory properties of the oil extraction residues are not described. Also unknown are post-treatments of the residues with the aim of obtaining highly functional ingredients for food, pet food, cosmetics and technical applications. The provision of preparations and ingredients from macauba pulp that offer all functional features and appeal to the senses is thus unknown in the prior art.

The patent literature also contains no information about such preparations that offer functional advantages and are appealing to the senses. For example, the document BR102012029493-1A2 describes the use of full-fat or partially defatted macauba pulp for use as animal feed. This document does not describe the use of macauba pulp as a functional dietary fibre preparation, nor possible methods for obtaining it. BR102014024972-9A2 describes the use of macauba pulp oil as an anionic collector for the mining industry. BR102016002700-4A2 describes the use of macauba pulp press cakes to produce xylitol. This is achieved by first hydrolysing the dietary fibre from macauba pulp. A reference to the use of the pulp for functional dietary fibre preparations that are appealing to the senses is not disclosed. PI 0906455-9A2 describes the use of macauba pulp press cakes for the production of lipase by solid phase fermentation. BR102015011035-9A2 describes the use of macauba pulp for producing fruit tablets. For this purpose, macauba pulp is mixed with maltodextrin and water and the mixture is shaped into a rectangle. After freeze-drying, a fruit tablet is obtained. Thus, none of these documents gives any indication as to whether light-coloured and functional dietary fibre preparations that are appealing to the senses for food, pet food, animal feed, cosmetics and technical applications can be obtained from macauba pulp.

Object of the Present Invention

The object of the present invention was to provide dietary fibre preparations with good technofunctional properties and appealing sensory properties, such as a bright colour and a neutral taste, inexpensively and without chemical modification, thereby avoiding the existing disadvantages of the prior art. In particular, the dietary fibre preparations should be suitable for the production of food, pet food and for technical applications.

DESCRIPTION OF THE INVENTION

Figure 1:
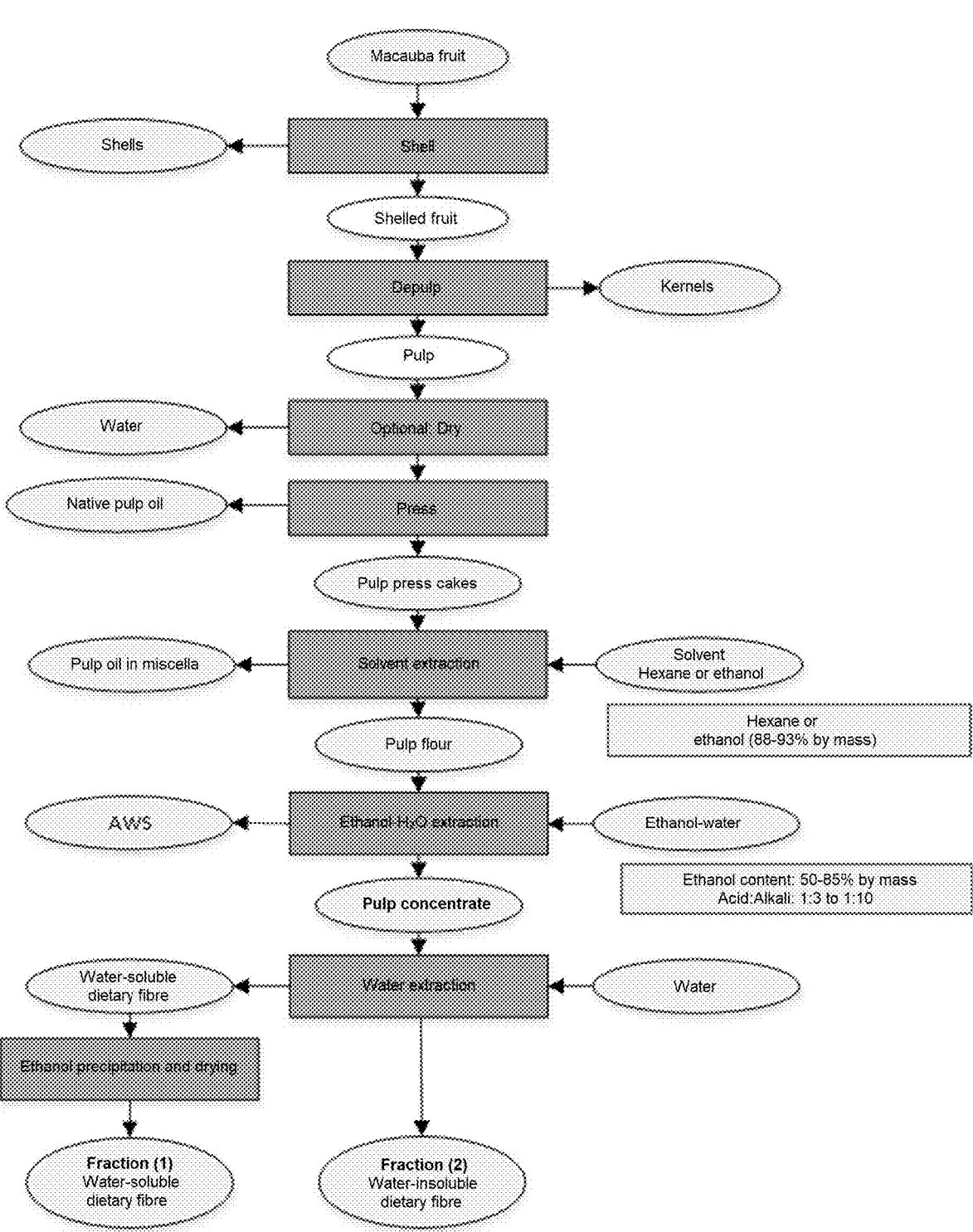
FIG. 1 is an exemplary variant of a method for producing the dietary fibre preparations, wherein the steps for obtaining the partially de-oiled pulp is shown.

The object is solved with the dietary fibre preparation and the method according to the claims. Advantageous variants of the dietary fibre preparation and of the method are the object of the dependent claims or may be discerned from the following description and the exemplary embodiments.

In the present patent application, the concept of dietary fibre is based on the comprehensive definition thereof by the CODEX *Alimentarius* as carbohydrate polymers that are not hydrolysed by the endogenous enzymes in the human small intestine. In particular, in the present patent application the term dietary fibres refers mainly to polysaccharides of the plant cell wall (including cellulose, hemicelluloses, gum and pectins) and lignin, which are resistant to hydrolysis by digestive enzymes and are precipitated in aqueous ethanolic solutions in a concentration of the same concentration or higher than 78% (v/v). The dietary fibre content is determined in the present patent application using the official method of the ASSOCIATION OF OFFICIAL ANALYTICAL CHEMISTS (AOAC International), based on the gravimetric assay after digestion of the sample with digestive enzymes, in particular α-amylase, protease and amyloglucosidase (reference method 991.43 from AOAC International).

In the context of the present invention, it was found that after removal of a portion of the alcohol-water soluble substances, residues that are obtained during the production of vegetable oil from the pulp of macauba fruit have a mainly neutral taste and despite their low cost can therefore be used directly, without further functionalisation, for raw materials and processing as high-quality dietary fibre preparation with very good technofunctional and sensory properties in foodstuffs, pet food, or in technical applications, for example for all of the applications of the prior art cited in the introduction to this description.

The preparation according to the invention has an oil content of lower than 20% by mass, advantageously lower than 10% by mass, better lower than 5% by mass, particularly advantageously lower than 3% by mass, more advantageously still lower than 2% by mass. In order to safeguard the microbiological and sensory properties, the water content in the preparation has values of lower than 20% by mass, advantageously lower than 15% by mass, particularly advantageously lower than 10% by mass, better lower than 7% by mass. When the water content has been lowered to a slight dampness, it is largely assured that hydrolysis and oxidation of the oil contained in the preparation according to the invention progresses slowly, thus avoiding the formation of smell- and flavour-active compounds.

The preparation according to the invention has particular advantages if the proportion of alcohol-water soluble substances (AWS) relative to the mass of the preparation is below 40%. In the following, all compounds that are soluble in ethanol-water mixtures with a mass fraction of 80% ethanol and at a temperature of 80° C. are understood to be alcohol-water soluble substances. Besides other soluble compounds, these are in particular sugars, including mono-, di- and oligosaccharides with up to 10 monomer units.

The product according to the invention is particularly light and has all the better functional properties if the proportion of alcohol-water soluble substances in the preparation is lower than 35% by mass, advantageously lower than 30% by mass, particularly advantageously lower than 20% by mass, better still lower than 10 by mass, optimally lower than 5% by mass. By separating the alcohol-water soluble substances as far as possible, the functionality of the dietary fibre preparation and the range of application can be increased.

Surprisingly, the sensory properties improve considerably with a reduced content of alcohol-water soluble substances, which consist for the most part of sugars. However, it is known from the prior art that sugars improve the sensory properties. Furthermore, when there are fewer alcohol-water soluble substances contained in the preparation according to the invention, the preparations with reduced content of alcohol-water soluble substances taste more neutral, the colour is lighter and the brown discolouration upon heating in the oven or extruder is less apparent. This is particularly beneficial for applications that require heating, such as heated foods, or polymers that need to be shaped in the extruder.

Essential properties of the dietary fibre preparation according to the invention from the pulp of macauba fruit are the following (mass and percentage figures are relative to the dry substance):

dietary fibre content higher than 25% by mass, better higher than 30% by mass, better still higher than 40% by mass, advantageously higher than 50% by mass, particularly advantageously higher than 60% by mass;

fat content lower than 20% by mass, lower than 10% by mass, advantageously lower than 5% by mass, particularly advantageously lower than 3% by mass;

bright colour, determined according to CIE-L*a*b* colorimetry with an L* value higher than 84, advantageously higher than 90, particularly advantageously higher than 95;

percentage of alcohol-water soluble substances in the dietary fibre preparation relative to the mass of the preparation less than 40%;

The preparation also has at least one, better several properties, e.g., emulsification and/or foaming and/or water- and/or oil binding. These functional properties are described in detail below.

The functional properties can be improved further if the particle size distributor of the dietary fibre preparations is adjusted within a certain range, for example by grinding. The preparations with a $D_{90}$ particle size of less than 1 mm ($D_{90}$ value: 90% of the volume of the particles are smaller than 1 mm), advantageously less than 500 µm, particularly advantageously less than 250 µm, are particularly easy to dispense in metered quantities and at the same time are functional. In some cases, the functionality can be increased even further with $D_{90}$ values smaller than 100 µm, which is why a preparation with this particle size distribution is advantageous. When comparing the dietary fibre preparations, it is noticeable that dosing is easier with a slightly higher fat content, since the dust content is lower. A fat content of less than 1% by mass is not as advantageous for dosing with $D_{90}$ values of less than 250 µm as a fat content between 2% by mass and 5% by mass. It is therefore advantageous not to de-oil the dietary fibre preparations to below 1% by mass. This can be achieved, inter alia, by using less lipophilic solvents such as ethanol or propanol instead of hexane.

After the dietary fibre preparation has been treated with solvents, the solvent content must be reduced. This entails temperatures from 25 up to 120° C., preferably more than 80° C., advantageously more than 100° C., and pressures less than 1 bar, advantageously less than 500 mbar, particularly advantageously less than 200 mbar.

Surprisingly, dietary fibre preparations that still contain a small quantity of solvent such as hexane or alcohol have advantages in terms of solubility and other functional properties compared with solvent-free preparations. In an advantageous variant, the preparation therefore contains organic solvents in the range from 1 to 8000 ppm, advantageously between 10 and 100 ppm. When alcohols are used, in some cases advantages have been found for ethanol or propanol contents greater than 1000 ppm up to 8000 ppm.

In the following, a distinction is made between flours (for comparison) and concentrates with regard to dietary fibre preparations made from the flesh of macauba fruits. In the present patent application, the products that are obtained directly after de-oiling, i.e., that still contain≥40% by mass alcohol-water soluble substances are referred to as flours. A concentrate is one of the dietary fibre preparations according to the invention that contains fewer alcohol-water soluble substances, namely less than 40% by mass, better less than 35% by mass, better still less than 30% by mass, preferably less than 20% by mass, particularly advantageously less than 10% by mass or even less than 5% by mass.

In advantageous embodiments, the use of processing adjuvants can contribute to a lighter colour and neutral sensory characteristics of the macauba dietary fibres. These include, for example, the use of acids such as citric acid, acetic acid, maleic acid, and antioxidants such as ascorbic acid, cysteine and sodium bisulfite in the reduction of alcohol and water-soluble substances. Oxygen content can also be reduced by applying inert gases such as nitrogen directly in the product and/or in the atmosphere of the processing plant, thereby preventing the oxidation of lipids and phytochemicals. Acids, antioxidants and inert gas can be used separately or in combination in one process step, preferably in several process steps.

The authors of the present application have found that the type of macauba plant also has a major influence on the properties of the preparations. Dietary fibre preparations from the fruits of *Acrocomia aculeata* sometimes differ significantly in some functional properties and in colour from, for example, *Acrocomia totai* or other species. For example, preparations from *A. aculeata* are particularly suitable as an emulsifier and often have a higher emulsifying activity index than *A. totai*. Thus, dietary fibre flours from *A. aculeata* have an emulsifying activity index greater than 30 $m^2/g$ of dry preparation and show an emulsion stability of longer than 5 minutes and an emulsifying capacity of more than 400 ml/g of dry preparation. Dietary fibre concentrates from *A. aculeata* have an emulsifying activity index of higher than 35 $m^2/g$ dry preparation, better higher than 55 $m^2/g$ dry preparation, particularly advantageously higher than 70 $m^2/g$ dry preparation, and create emulsions with an emulsion stability longer than 30 minutes, advantageously longer than 60 minutes, particularly advantageously longer than 120 minutes. Dietary fibre concentrates from *A. aculeata* have an emulsifying capacity of greater than 500 mL/g dry preparation, preferably greater than 600 mL/g dry preparation, especially greater than 700 mL/g dry preparation. The emulsifying properties of the dietary fibre preparations can be significantly improved by adding 10 to 90, by mass of macauba protein flour or of other plant protein preparations (percentage relative to the protein content in the mixture or dietary fibre preparation and a protein obtained through the addition), advantageously 20-30% by mass, particularly advantageously 40-60% by mass.

Dietary fibre preparations from the fruits of *A. totai* are also suitable as emulsifiers. Although they only achieve lower values for the emulsifying activity index, their emulsifying stability is many times greater than that of *A. aculeata*. Thus, dietary fibre flours from *A. totai* have an emulsifying activity index of more than 25 $m^2/g$ dry preparation and have an emulsion stability of more than 30 minutes and an emulsifying capacity of more than 300 mL/g dry preparation. Dietary fibre concentrates from *Acrocomia totai* have an emulsifying activity index greater than 25 $m^2/g$ dry preparation, better greater than 35 $m^2/g$ dry preparation, particularly advantageously greater than 45 $m^2/g$ dry preparation and create emulsions with an emulsion stability longer than 30 minutes, advantageously longer than 60 minutes, particularly advantageously longer than 120 minutes, in individual cases longer than 180 minutes. Dietary fibre concentrates from *A. totai* have an emulsifying capacity of more than 500 mL/g dry preparation, better more than 600 ml/g dry preparation, especially more than 700 mL/g dry preparation.

Dietary fibre preparations made from the fruits of *A. aculeata* also exhibit foaming properties. Dietary fibre flours from *A. aculeata* have a foaming activity of more than 100% by volume and achieve a foam stability of more than 5% by volume. Dietary fibre concentrates from *A. aculeata* show significantly better foaming properties. They achieve foaming activity values greater than 200% by volume, advantageously greater than 400% by volume, particularly advantageously greater than 600% by volume, and achieve a foam stability of greater than 25% by volume, advantageously greater than 50% by volume, particularly advantageously greater than 75% by volume %, in some cases even more than 90% by volume.

Dietary fibre preparations from the fruits of *A. totai* already show particularly good foam-forming properties as flours, i.e., even without prior separation of the alcohol-water soluble substances. Dietary fibre flours from *A. totai* have a foaming activity of more than 200% by volume and achieve a foam stability of more than 25% by volume. The properties of foam formation are comparable with dietary fibre concentrates from *A. totai*, but the concentrates are even lighter in colour. They achieve foam activity values of greater than 200% by volume, better greater than 400% by volume, particularly advantageously greater than 600% by volume, in some cases greater than 700% by volume, and achieve a foam stability of greater than 25% by volume, advantageously greater 50% by volume, particularly advantageously greater than 75% by volume, in individual cases even greater than 85% by volume. This means that these preparations come very close to egg white in terms of their properties and colour, so that use of the preparations according to the invention in herbal substitutes for egg white becomes feasible.

The values for oil and water binding of the preparations according to the invention are also very high compared to other preparations made from other raw materials. These parameters also show that concentrates usually have better properties. The water-binding capacity of dietary fibre flours from *A. acuelata* is greater than 1 mL/g DS (g DS: relative to one grain in dry substance). The water-binding capacity of dietary fibre concentrates from *A. acuelata* is greater than 1.5 mL/g DS, advantageously greater than 3 mL/g DS, particularly advantageously greater than 4 mL/g DS. The water binding capacity of dietary fibre flours from *A. totai* are comparable. Flours show values greater than 1 mL/g DS. Concentrates from *A. totai* have a water binding capacity greater than 1.5 mL/g DS, advantageously greater than 3 mL/g DS, particularly advantageously greater than 4 mL/g DS. The oil binding capacity of dietary fibre flours from *A. acuelata* is greater than 1 mL/g DS. The oil-binding capacity of dietary fibre concentrates from *A. acuelata* is greater than 1.5 mL/g DS, advantageously greater than 3.5 mL/g DS, particularly advantageously greater than 5 mL/g DS. The oil-binding capacity of dietary fibre flours from *A. totai* is greater than 0.8 mL/g DS. The oil-binding capacity of *A. totai* concentrates is greater than 1.5 mL/g DS, advantageously greater than 3.5 mL/g DS, particularly advantageously greater than 4.5 mL/g DS.

This shows the very good suitability of the dietary fibre preparations from macauba pulp according to the invention for a variety of applications in foods, in particular due to their bright colour, neutral sensory properties and good functionality. By de-oiling the pulp from macauba fruit and reducing the content of alcohol-water soluble substances, it is thus possible to simply provide a natural, functional thickening agent or dietary fibre for food applications, e.g., for producing foams (cakes, fillings, baked goods) or emulsions (cremes, mayonnaise, sauces, confectionery, delicatessen items) and many others. The concentrates according to the invention are also suitable for use in pet food. Unlike conventional animal feed, in the case of pet food for dogs, cats or other pets with a very good sense of smell, it is important for pet food to have a particularly neutral smell and taste, especially with regard to typical plant-based green, grassy, beany and bitter or astringent smells and tastes. These neutral sensory attributes are achieved with the preparations according to the invention.

Preparations made from *A. totai* are particularly advantageous for foams and gels due to the foam volumes that can be achieved and the bright colour. Thus, a particularly suitable profile in terms of functionality and sensory perception can be obtained by selecting the type or also the variety of the macauba plant.

Depending on the degree of ripeness of the fruit or the selected type of macauba plant (e.g., *A. aculeata* or *A. totai*), after separating the oil from the pulp and after reducing the content of alcohol-water soluble substances, a dietary fibre preparation is obtained that is pale yellow to almost white in colour, has a neutral taste and very good technofunctional properties. To ensure that preparations according to the invention are selected very specifically for different applications and adapted to applications depending on the degree of ripeness, type, variety and growth conditions. Despite the very low costs, very high-quality preparations are available for many different branches of industry.

In particularly advantageous embodiments of the invention, the concentrate is fractionated into as many as six further fractions, thereby yielding particularly functional and valuable fractions as dietary fibre preparations. These are: (1) a water-soluble fraction (soluble in water between 5 and 100° C.) and a water-insoluble residual fraction (2). The fraction (2) can be separated into a second soluble pectin fraction (3) and an insoluble fraction (4) with the aid of an alkaline and chelating extraction milieu. For this, 0.05-0.1 mol/L NaOH or sodium carbonate are used to assure a mild alkaline state, and 0.5 mmol EDTA or CDTA or 0.5% (m/v) ammonium oxalate for the chelating activity.

Fraction (4) can in turn be separated into a soluble hemicellulose fraction (5) and an insoluble cellulose-rich residue (6) with the aid of highly concentrated potassium hydroxide solution (1-4 mol/L), optionally with the addition of 10 to 50 mmol of sodium borohydride. These fractions have very different water and oil binding properties. Fraction (1) is particularly readily and transparently soluble in water, forms firm gels and enables tear-resistant and flexible films to form after dewatering—even without the addition of plasticisers or crosslinking agents. The fewer alcohol-water soluble substances contained in fraction (1), the better the properties of the films. Efforts will therefore be made to reduce the proportion of alcohol-water soluble sugars in fraction (1) to values below 40% by mass, advantageously below 30% by mass, better below 20% by mass, particularly advantageously below 10% by mass, still better below 5% by mass. It has been found that films produced with fraction (1) become more transparent and stronger than films with high contents of alcohol-water soluble substances as the content of alcohol-water soluble substances decreases. Fraction (1) is therefore suitable both for use in foams and gels in food, cosmetics and pet food, and for technical films, coatings, adhesives as well as other applications. With regard to its functional properties, because it dissolves readily in water, fraction (1) is characterized by minimal to undetectable water binding and only weak oil binding, which is advantageously between 0.5 and 2 mL oil/g DS. This value for oil binding also characterizes the property of fractions (3) and (5). On the other hand, fraction (6) shows particularly good oil binding capability with values greater than 5 mL oil/g DS to greater than 8 mL oil/g DS.

The insoluble fractions obtained in the fractionation steps manifest particularly good properties with regard to water binding. Here the water binding of macauba flour and concentrate with values greater than 1 to greater than 3 mL/g DS increased to values of greater than 4 to greater than 8 mL/g DS in fractions (2), (4), (5) and (6). Only fraction (3), with less than 2 mL/g DS, shows less pronounced water binding.

As with the concentrate, all of the above fractions can be used for all applications in which functionalities especially in conjunction with water are required. This applies to all types of food, cosmetic products and pet food, or for edible or non-edible coatings and films on food, e.g., to prolong shelf life. When used in food, the similarity of macauba concentrate to guar gum and locust bean gum is striking, since the behaviour in terms of rheology, gel formation and thickening is often comparable.

The preparations according to the invention are also suitable for technical adjuvants. These may be emulsifiers for paint and varnish, technical foaming agents, technical films, foils and coatings, adhesives, lubricants or drilling fluids in petroleum production. Especially in this sector of the extraction of fossil resources, more and more attention is focused on environmentally friendly thickeners, a requirement that can be met very well with macauba preparations.

The method according to the invention for producing the dietary fibre preparations is described below. The method includes at least the following steps:

Providing partially de-oiled pulp from macauba fruits, preferably from *Acrocomia* acuelata and/or *Acrocomia totai*, with a fat content between 3% by mass and 60% by mass relative to dry substance. The fat contents of the partially de-oiled pulp may vary depending on plant species or time of harvest, or they may differ as a consequence of their pretreatment (e.g., pre-pressing, drying, flaking, mechanical pressing, other conventional methods for recovering vegetable oil).

Reducing the oil content in the pulp to values (in DS) less than 20% by mass, preferably less than 10% by mass, better less than 5% by mass, particularly advantageously less than 3% by mass, better still less than 2% by mass with the aid of extraction methods.

Reducing the content of alcohol-water soluble substances in the pulp to values (in DS) less than 40% by mass, better 35% by mass, preferably less than 30% by mass, advantageously less than 20% by mass, particularly advantageously less than 10% by mass, better still less than 5% by mass with the aid of an extractive fractionation methods. In this way, the pulp concentrate is obtained. Advantageously, solid-liquid extraction methods are used (e.g., in the form of mixer reactor, percolation, counterflow extraction, etc.). Dry fractionation techniques such as grinding, sieving and air separation may also be used.

Optionally and Advantageously:

The oil content is reduced with the aid of solvents. The following are examples of possible solvents in this context: hexane, ethanol, propanol, supercritical $CO_2$ or other sub- or supercritical solvents and other organic solvents.

Use of mixtures of ethanol and water in a mass ratio from 94:6 to 90:10 (ethanol in water in each case) at temperatures from 40-70° C., advantageously 50-65° C. for the simultaneous separation of oil and soluble substances from the macauba pulp.

Further reduction of the oil content and reduction of the content of alcohol-water soluble substances in the pulp by using water or mixtures of alcohol and water in a mass ratio (alcohol to water) less than 90:10, better less than 80:20 to recover the pulp concentrate. In this context, propanol or ethanol preferably serve as the alcohol, with a temperature between 4° and 90° C., advantageously between 65 and 85° C., particularly advantageously at 80° C., so that dissolving of alcohol-insoluble carbohydrates is largely avoided.

Use of acidified water-alcohol mixtures with a pH in the range from 2.0-6.0 to reduce the content of alcohol- and water-soluble substances in the pulp. This can be achieved by using acids, preferably mild organic acids such as citric acid, acetic acid or maleic acid.

Use of antioxidant additives in water-alcohol mixtures to reduce the content of alcohol- and water-soluble substances in the pulp. This can be done, for example, with ascorbic acid, cysteine or sodium bisulfite.

Reduction of the oxygen content in the extraction medium and in the device atmosphere to prevent the oxidation of oil and phytochemicals. This can be done with inert gases such as nitrogen.

Further reduction of the alcohol-water soluble substances by dry fractionation. The partially defatted macauba pulp is optionally ground or further processed directly. A cutting mill, ball mill, impact mill or jet mill may be used for grinding, and the degree of grinding may be reduced to a D90 volume particle size of less than 2 mm, advantageously less than 500 μm, better less than 250 μm, particularly advantageously less than 100 μm. The material is then sieved screen opening diameters from 2 mm to 50 μm using 1 to 10 different sieves. Air separation can be performed using various air sifting methods such as gravitational countercurrent, gravitational crosscurrent, centrifugal countercurrent, and centrifugal crosscurrent.

Fractionation of the water-soluble dietary fibre fraction from the alcohol-water soluble substances in the following steps:

Extracting the pulp using a mixture of alcohol and water to separate alcohol-water soluble substances from the water-soluble dietary fibres, separating the sugar-containing extract from the raffinate, optionally in several consecutive stages, and then extracting the raffinate with water, preferably at temperatures above 30° C., more preferably above 40° C., to recover the water-soluble dietary fibre fraction, and/or Extracting all sugars and water-soluble dietary fibres with water, preferably at temperatures above 30° C., more preferably above 40° C., separating the extract from the raffinate; followed by separation of the extract into a fraction which is readily soluble in alcohol-water mixtures and a fraction which is not readily soluble in alcohol-water mixtures by ultrafiltration or alcohol precipitation of carbohydrates that are insoluble in alcohol-water mixtures, or Fractionating the water-soluble dietary fibres by dry fractionation. The concentrate is optionally ground (cutting mill, ball mill, impact mill or jet mill) to a D90 volume particle size of less than 2 mm, advantageously less than 500 μm, better less than 250 μm, particularly advantageously less than 100 μm, or it undergoes further processing without grinding. The material is then sifted with sieve opening diameters from 2 mm to 50 μm with 1 to 10 different sieves. Air separation may be carried out using various air separation methods, such as gravitational counterflow, gravitational cross flow, centrifugal counterflow and centrifugal crossflow. The water-soluble and water-insoluble fibres present in the dry state are separated into various fractions thereby.

Fractionating the dietary fibres, preferably after de-oiling to less than 5% by mass and/or substantial reduction of the alcohol-water soluble substances by aqueous extraction at 40° C., by means of: Separating an aqueous extract from a raffinate and preferably drying the water-soluble fraction (1), extracting the raffinate (fraction 2) using NaOH-EDTA solution with 0.05-0.1 mol/L NaOH or sodium carbonate and 0.5 mmol EDTA or CDTA or 0.5% (m/v) ammonium oxalate solution, and separating and drying the soluble fraction (3) from an insoluble raffinate (fraction 4), and finally extracting with concentrated alkali (1-4 mol/L), e.g. potassium hydroxide solution, and separating, neutralising and drying the extract (fraction 5) from the insoluble residue (fraction 6).

The functional properties of these 6 fractions may also be further improved after the drying step if the particle size distribution of the dietary fibre preparations is adjusted to a specific range by grinding with a cutter, impact, ball or impact mill in combination with the use of sieves and sieve inserts. The preparations with a $D_{90}$ particle size of less than 1 mm, advantageously less than 500 μm, particularly advantageously less than 250 μm, better less than 100 μm, are particularly functional.

It has further been found advantageous that the properties of the preparations can be improved if a defined heating takes place before drying. The temperature here should be in a range between 7° and 120° C., advantageously between 70 and 100° C., particularly advantageously between 7° and 80° C. The duration of the treatment should not be more than 60 minutes, advantageously less than 30 minutes, particularly advantageously less than 15 minutes.

The following section describes how the full-fat or partially de-oiled pulp may be made available. After the macauba fruits have ripened, they are advantageously separated gently from the fruit cluster, ideally at different times depending on the degree of ripeness. The quality of both the oil and the pulp is best if individual fruits are harvested separately from the fruit clusters. It is also possible to cut the entire fruit clusters from the palm. Then, the falling fruit cluster should advantageously be caught softly, e.g., with a soft foil or some other system for gently breaking the fall, in order to avoid damaging the outer shell.

Before the further mechanical processing of the fruits, the surface of the fruits should advantageously undergo heat treatment, to a surface temperature above 70° C., advantageously above 75° C., particularly advantageously above 80° C. for at least 1 minute (definition of the duration: from the time the maximum temperature is reached until the temperature falls below 65° C.), advantageously longer than 10 minutes or 20 minutes, particularly advantageously longer than 30 minutes. After this, the water content of the outer shell should advantageously be reduced to a value less than 20% by mass, advantageously less than 10% by mass, to enable efficient shelling and reduce the amount of pulp in the shell fraction. Any known form of drying can be used in this context. The person skilled in the art will be able to select the suitable method from the many possible drying methods depending on the desired quality of the oil and the intended drying rate—from drying in the open air or sun-drying, in a ventilated or unventilated hall, or a simple circulating air dryer, contact or convection dryer, or any other means up to vacuum drying.

It has been found to be particularly advantageous for high oil quality if not only the shell is dried, but the water content in the entire fruit is also lowered to a value less than 20% by mass, advantageously less than 15% by mass, particularly advantageously less than 10% by mass. Particularly after extensive drying to values less than 10% by mass, the fruits can be kept for longer, and the quality of the oil is improved.

After the drying and optional interim storage, the epicarp is shelled in a shelling device according to the state of the art. It should be ensured here that the parameters are chosen such that less than 20% by mass pulp is left in the epicarp fraction, advantageously less than 10% by mass, particularly advantageously less than 5% by mass relative to the mass of the shell fraction. It is not possible to achieve this in one pass, a subsequent step of separating epicarp from pulp must be provided.

As a result of the shelling, it must further be ensured that after shelling only very small quantities of shell or no shell at all is included in the pulp fraction. Shelling must therefore be carried out in such manner that the separated pulp finally has a shell content of less than 10%, better less than 5%, preferably less than 2% by mass, relative to the dry substance. The person skilled in the art of fractionating plant raw materials will be able to select the appropriate equipment and process parameters for this separation task.

In the following step, the pulp is separated from the inner, hard shell of the drupe kernel, the endocarp. This can be carried out with cutting mills or other machines, which are known to the person skilled in the art. For reasons relating to the sensory appeal of the preparations according to the invention, this process will advantageously be designed in such manner that the content of pieces from the black endocarp in the pulp is less than 3% by mass, advantageously less than 1% by mass, particularly advantageously less than 0.1% by mass. The pulp obtained thereby is introduced into the method according to the invention. A further pretreatment may consist in a partial de-oiling. As a result of the special separation of quantities of the endocarp from the pulp, the oils obtained thereafter by mechanical or extraction means have a particularly low content of lignin or other phenolic component, and the taste of the oil is consequently more neutral.

The mechanical de-oiling will be carried out after separation of the water from the pulp by drying to values less than 30% by mass, better less than 20% by mass, advantageously less than 15% by mass, particularly advantageously less than 10% by mass, advantageously in a continuously operating press, e.g., a screw press, an extruder or another mechanical pressing apparatus. In this process, the oil content will advantageously be reduced to less than 30% by mass, particularly advantageously less than 20% by mass, or less than 15% by mass. Particularly advantageous techno-functional properties of the dietary fibre preparations according to the invention are obtained if the oil content after the mechanical de-oiling is between 15 and 25% by mass, since heat damage due to excessive friction can thus be avoided.

The following text is a brief description of the analytical methods used for the quantitative characterization of the dietary fibre preparations produced:

Dietary Fibre Content:

The dietary fibre content is defined as the content derived from the gravimetric determination method after enzymatic digestion of the sample (AQAC method 991.43) [8].

Protein Content:

The protein content is defined as the content calculated by determining the nitrogen in a sample and multiplying the value thus determined by the factor 6.25. In the present patent application, the protein content is expressed as a percentage relative to the dry substance. Reference methods for determining the protein content are the Dumas combustion method [9] and the Kjeldahl digestion method [10].

Colour:

The perceptible colour is defined by CIE-L*a*b* colorimetry (see DIN 6417). The L* axis indicates brightness, wherein black has the value 0 and white the value 100, the a* axis describes the green or red component, and the b* axis describes the blue or yellow component. The L* values stated in the present patent application relate to a measurement for a D90 particle size of the dietary fibre preparation of 250 μm.

Emulsifying Properties:

The emulsifying activity index and the emulsion stability are determined as in [11].

The emulsifying capacity is determined using the method described in [12]. Corn oil is added to a 1% by mass suspension of the dietary fibre preparation with a volume of 100 ml at pH 7, the mixture is stirred to form an emulsion using an Ultraturrax and oil is further metered in until phase inversion of the oil-in-water emulsion occurs. The emulsifying capacity is defined as the maximum oil absorption capacity of the suspension of water and dietary fibre, determined via the spontaneous decrease in conductivity during phase inversion. The emulsifying capacity is expressed in ml oil/g dietary fibre preparation, i.e., millilitres of emulsified oil per gram of dietary fibre preparation.

Fat Content:

The fat content is determined gravimetrically with the Sohxlet method [13] (AQAC method 920.39).

Foaming Activity:

The foam activity is expressed in percent, measured as the increase in volume of a fibre solution, pH 7, when whipped for 8 minutes at level 3 (591 rpm) in a Hobart 50N standard food processor (steel mixing bowl with 5 litres' capacity) with a whisk (wire whisk).

Foam Stability:

Foam stability is expressed as a percentage, measured as the remaining volume of 100 ml of foam within one hour after whipping as described in foaming activity.

Water Content:

The water content is determined gravimetrically according to § 64 LFGB methods [14] at 105° C. until constant weight is reached.

Alcohol-Water Soluble Substances Content:

The content of alcohol-water soluble substances is determined gravimetrically as follows: The sample (macauba flour, dietary fibre preparation or fibre fraction) is dispersed in aqueous ethanol 80% (v/v) in a solid-liquid ratio of 1:10 (m/v). The dispersion is maintained at boiling temperature (about 80° C.) while stirring gently for 60 minutes. The mixture is then centrifuged (3300 g, 20 min, 20° C.) and filtered, and the supernatant (liquid phase) is retained. The solid pellet is extracted with 80% aqueous ethanol under similar conditions to those described above, until a clear extract is obtained (at least 5 extraction cycles). After the extraction cycles have been completed, the liquid extracts are combined, the ethanol is distilled, and the water is evaporated overnight at 105° C. The solid quantity that remains after drying is weighed and recorded as a percentage of the sample quantity that underwent extraction at the start of the analysis.

Water Binding Capacity:

The water binding capacity is determined using the method of the American Association of Cereal Chemists [15].

Oil Binding Capacity:

The oil binding capacity is determined at room temperature. The sample is dispersed in an excess of oil and, after complete mixing and centrifugation, the volume of oil not bound by the product is determined. The reference method is provided by [16].

EXEMPLARY EMBODIMENTS

Figure 2:
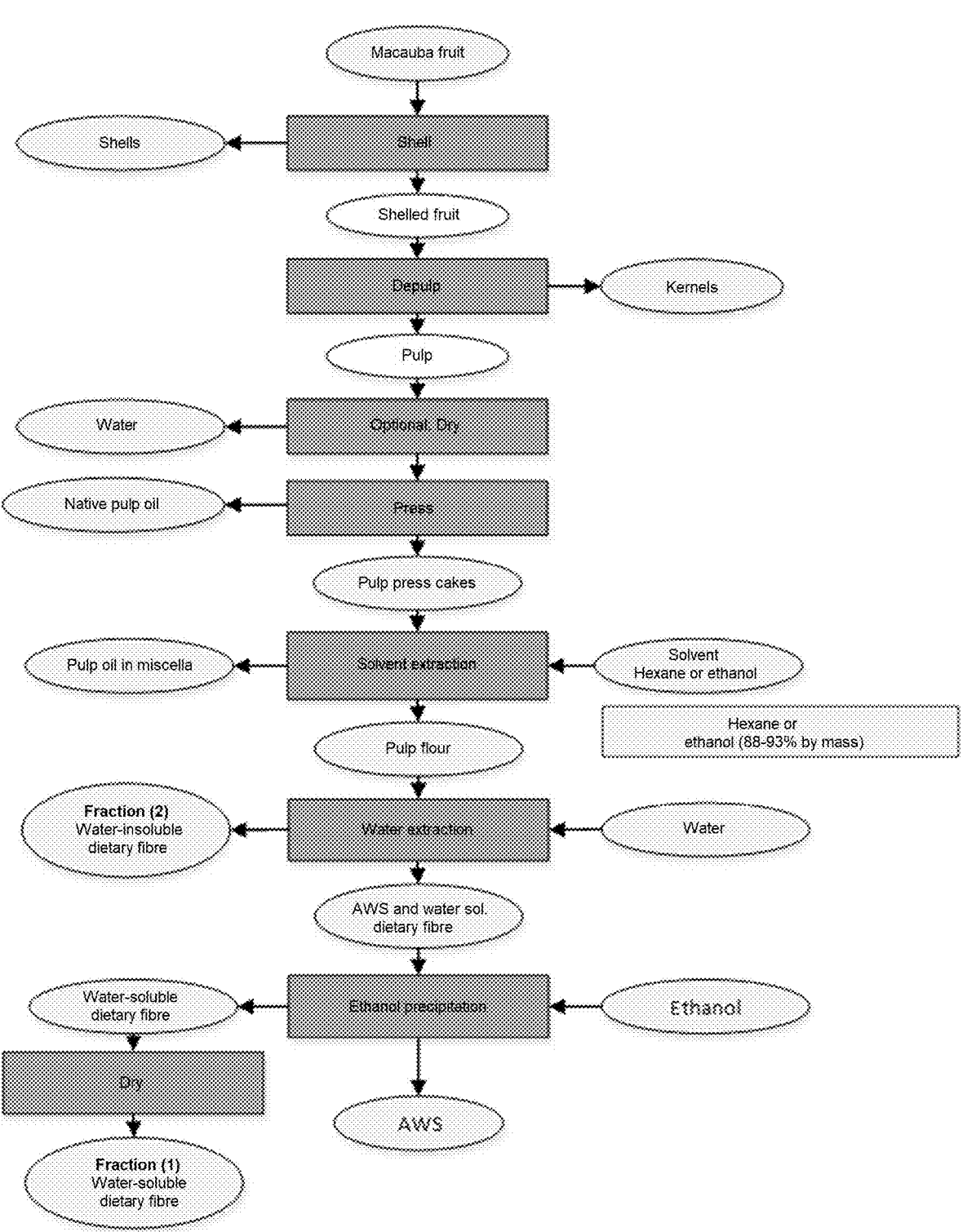
FIG. 2 is a second exemplary variant of another method for producing the dietary fibre preparations, wherein the steps for obtaining the partially de-oiled pulp is shown.

FIGS. 1 and 2 show two exemplary variants of methods for producing the suggested dietary fibre preparations, wherein in these examples the steps for obtaining the partially de-oiled pulp are also shown.

Example 1

(For Comparison Only)

Three samples of macauba fruits consisting of 20 fruits per sample from different harvest regions and from different species were separated from the outer shell (epicarp) by hand. The pulp was then also manually separated from the inner core (endocarp) and the pulp obtained therefrom was analysed. The water content in the 3 samples was between 33 and 53% by mass, depending on origin, type and storage duration. After drying the pulp at 45° C. for 12 hours in the oven, three samples of almost anhydrous pulp gave the following compositional average values (Table 1):

TABLE 1

| Average composition of macauba pulp from 3 different raw materials (DS: relative to dry substance) | |
| --- | --- |
| Component | Average +/− |
| Fat (% by mass DS) | 46.1-59.3 |
| Protein (% by mass DS) | 1.2-4.8 |
| Ash (% by mass DS) | 1.6-3.3 |
| Dietary fibre (% by mass DS) | 17.0-27.0 |
| Carbohydrates (% by mass DS) | 20.1-36.2 |
| Sugar (% by mass DS) | 10.6-32.8 |

Example 2

Two 500 g samples each of pulp of *A. aculeata* and *A. totai* obtained as in Example 1 were fractionated into 2 preparations. One fraction (pulp meal) was obtained by pressing the dried pulp to an oil content of 20% by mass, followed by de-oiling with pure ethanol in a Soxhlet apparatus for 12 hours (meal). The de-oiled sample was then divided, one part was analysed directly, the other part was extracted several times according to the present invention with a mixture with a mass ratio of 20% water and 80% ethanol at 80° C., wherein the extract was separated from the raffinate, and fresh solvent added in each stage. In the end, the mass of the pulp concentrate, based on DM, was equal to about 60% of the mass of the flour used. The compositions shown in Table 2 and the functional properties of the fractions shown in Table 3 were obtained. By treatment with a mixture of ethanol and water, the proportion of dietary fibres could be significantly increased from 40.5% by mass to over 80% by mass and the proportion of carbohydrates (determined from differential measurement) was reduced from over 50% by mass to 10.6% by mass.

TABLE 2

| Composition of de-oiled macauba pulp flour (MPF) and pulp concentrate (MPC) from (*Acrocomia aculeata*) relative to dry substance (DS) | | |
| --- | --- | --- |
| | Composition (% by mass in DS) | |
| Component | MPF | MPC |
| Dietary fibres | 40.5 | 80.5 |
| Protein | 3.9 | 6.3 |
| Fat | 1.0 | <0.5 |
| Ash | 3.6 | 2.1 |
| AWS | 51.5 | 10.6 |

TABLE 3

Functional properties of pulp flour (MPF) and pulp concentrate (MPC) relative to DS

| | *A. acuelata* | | *A. totai* | |
|---|---|---|---|---|
| Functional properties | Flour | Concentrate | Flour | Concentrate |
| Water binding capacity (mL/g DS) | 3.68 ± 0.03 | 4.61 ± 0.04 | 3.32 ± 0.11 | 4.71 ± 0.26 |
| Oil binding capacity (mL/g DS) | 3.50 ± 0.05 | 5.41 ± 0.18 | 2.53 ± 0.25 | 5.03 ± 0.25 |
| Foaming activity (% by vol.) | 234.5 ± 26.7 | 685.9 ± 7.3 | 731.3 ± 0.1 | 798.4 ± 22.2 |
| Foam stability (% by vol.) | 11.5 ± 4.4 | 93.3 ± 2.2 | 88.3 ± 5.5 | 86.7 ± 2.2 |
| Emulsification activity index (m$^2$/g DS) | 68.9 ± 1.4 | 75.5 ± 13.2 | 62.0 ± 3.4 | 49.7 ± 2.2 |
| Emulsion stability (min) | 27.2 ± 5.3 | 157.6 ± 23.0 | 164.6 ± 6.2 | 242.5 ± 57.0 |
| Emulsifying capacity (mL/g DS) | 420 ± 25 | 798 ± 19 | 350 ± 3 | 685 ± 3 |
| L* value | Not measured | Not measured | 90.47 ± 0.07 | 89.70 ± 0.08 |

Example 3

A 500 g sample of *A. aculeata* pulp concentrate obtained as in Example 2 was fractionated in accordance with the present invention. For this, 5000 mL water at 40° C. was added to the concentrate, the mixture was stirred for 30 minutes, and then the insoluble portion was separated from the soluble portion by filtration. The process was repeated 3 times. The soluble fraction (1) 5 obtained was dried and ground to analytical fineness. The residue was extracted three times with a 0.05 mol/L NaOH solution to which 0.5 mmol/L EDTA was added. A pectin-rich fraction (3) was obtained as the soluble fraction, dried and ground. In the third step, the residue (fraction 4) was again extracted three times with concentrated potassium hydroxide solution 2 mol/L, the soluble supernatant (fraction 5) was separated from the insoluble residue (fraction 6). All fractions were dried and ground. The water and oil binding (Table 4) and the flow properties (Table 5) were determined for all samples.

TABLE 4

Functional properties of fractions from macauba pulp (*A. acuelata*)

| Macauba pulp fraction | Water binding (mL/g DS) | Oil binding (mL/g DS) |
|---|---|---|
| Macauba pulp flour | 3.7 ± 0.0 | 3.5 ± 0.0 |
| Water soluble fraction (1) | Not determinable | 1.1 ± 0.1 |
| Fraction (3) | 1.3 ± 0.3 | 1.1 ± 0.2 |
| Fraction (5) | 4.6 ± 0.2 | 1.1 ± 0.3 |
| Insoluble fraction (6) | 8.8 ± 0.1 | 8.2 ± 0.3 |

Regarding water and oil binding, it has been found that a targeted adaptation of the functional properties is made possible by fractionating the pulp concentrate. Thus, the insoluble fraction (6), like the fractions (2) and (4) not shown in Table 4, manifests very good binding properties regarding both water binding and oil binding. On the other hand, oil binding is very low in fractions (1), (3) and (5), at about 1.1 mL/g DS, water binding in fractions (5) and (6) is also very high.

TABLE 5

Flow properties of fractions from macauba pulp (*A. aculeata*)

| Concentration (g preparation/ 100 g solution) | Water/soluble fraction (1) | | Fraction (3) | | Insoluble fraction (6) | |
|---|---|---|---|---|---|---|
| | k (mPa · s) | n | k (mPa · s) | n | k (mPa · s) | n |
| 0.5 | 19.37 ± 3.60 | 0.92 | 0.13 ± 0.02 | 1.54 | 0.18 ± 0.01 | 1.46 |
| 1.0 | 221.13 ± 2.36 | 0.76 | 0.11 ± 0.01 | 1.60 | 1.35 ± 0.62 | 1.21 |
| 2.5 | (9.11 ± 0.07) · 10$^3$ | 0.47 | 32.75 ± 7.15 | 0.82 | Not determinable nd | nd |
| 5.0 | (93.46 ± 4.88) · 10$^3$ | 0.34 | (12.97 ± 0.06) · 10$^3$ | 0.53 | nd | nd |

The rheological behaviour of the water-soluble fraction (1) is revealed to be dependent on the concentration. In diluted dispersions of up to 1 g of preparation per 100 g of solution, a viscous liquid behaviour is observed with (G ">G"). The rheological behaviour shifted to a weak gel and then to a gel as the content was increased from 1 to 2.5 and then to 10 g/100 g. A similar profile was also observed for locust bean gum solution at 1 g/100 g, although its modulus (both G "and G") was between that of the water-soluble fraction (1) at 2.5 and 5 g/100 g.

Gel-like behaviour was also observed for fraction (3) with a content of 5 and 10 g/100 g. The dispersions of the insoluble fraction (6) exhibited gel-like behaviour over the entire concentration range (in the range from 1 to 10 g/100 g). Overall, all fractions tested formed weak gels, the values of tan (δ) were higher than 0.1.

The influence of temperature on the rheological properties of the dispersions of the fractions according to the invention in water was also evaluated. The water-soluble fraction (1) proved to be more temperature-sensitive, with a transition from gel to viscous solution being observed for 5 and 10 g/100 g. Fraction (3) and the insoluble fraction (6) also showed a reduction both of G "and also of G", but both retained gel behaviour over the tested temperature range (5 to 80° C.).

Example 4

The film-forming property of the water-soluble fraction (1) extracted with water from the dietary fibre preparation was evaluated qualitatively to determine whether an edible coating or confectionery such as gummy bears can be prepared from the fraction. To do this 20 g of a 2.5% aqueous solution of the water-soluble fraction was poured into a petri dish (diameter 9 cm). The solution was then dried overnight at 25° C. in an air-circulating oven. The film obtained was brownish in colour, easily detachable from the petri dish, and mouldable. The water-soluble film showed good properties as an edible coating or as a base for confectionery, particularly since it was not necessary to use plasticisers for flexible deformation.

Example 5

A pulp concentrate from macauba pulp from *A. totai* was prepared as described in Example 2. The preparation obtained was partly used as a substitute for whole egg in muffins as described in Table 6.

TABLE 6

Recipe for muffins, made with a macauba pulp concentrate according to the invention

| Ingredient | Ingredient proportions (%) | |
| | Control with whole egg only | with macauba dietary fibre concentrate |
| --- | --- | --- |
| Wheat flour | 25.0 | 25.0 |
| Sugar | 25.0 | 25.0 |
| Whole egg powder | 4.4 | 1.1 |
| Dietary fibre concentrate from (*A. totai*) | 0.0 | 1.1 |
| Whole milk | 19.3 | 19.3 |
| Vegetable oil | 12.5 | 12.5 |

TABLE 6-continued

Recipe for muffins, made with a macauba pulp concentrate according to the invention

| Ingredient | Ingredient proportions (%) | |
| | Control with whole egg only | with macauba dietary fibre concentrate |
| --- | --- | --- |
| Baking powder | 1.0 | 1.0 |
| Water | 12.9 | 15.1 |
| Total | 100.0 | 100.0 |

As an emulsifier, macauba fibre concentrate was very suitable for partially replacing whole egg in muffins. The muffins produced obtained were very similar to the control in appearance, texture, colour and taste.

Example 6

A pulp concentrate from macauba pulp from *A. totai* was prepared as described in Example 2. The preparation obtained was used to prepare a vegetable milk as shown in Table 7.

TABLE 7

Recipe for plant-based milk, made with a macauba pulp concentrate according to the invention

| Ingredient | Ingredient proportions (%) |
| --- | --- |
| Water | 96.0 |
| Pulp concentrate from (*A. totai*) | 2.0 |
| Rapeseed oil | 1.0 |
| Sugar | 1.0 |
| Total | 100.0 |

The milk preparation consisted of suspending macauba pulp concentrate in water at 50° C. until a homogeneous dispersion was obtained, then adding sugar. Thereafter, rapeseed oil was added and emulsified for 5 minutes at 21,000 rpm. The mixture was filtered using a sieve with an opening diameter of 125 µm and homogenised at 250 bar in the first stage and 50 bar in the second stage. Subsequently, the homogenised milk was pasteurised at 80° C. for 10 minutes and stored at 4° C. The resulting plant-based milk had a pleasant taste, mouthfeel and good stability. Therefore, macauba pulp concentrate is very suitable for the production of plant-based milk.

Example 7

A pulp concentrate made from macauba pulp from *A. totai* was produced in the same way as described in Example 2. The preparation obtained was used to make a second type of plant-based milk as shown in Table 8.

TABLE 8

Recipe for plant-based milk (2), made with a macauba pulp concentrate according to the invention

| Ingredient | Ingredient proportions (%) |
| --- | --- |
| Water | 95.97 |
| Dietary fibre concentrate from (*A. totai*) | 2.00 |

19

TABLE 8-continued

| Recipe for plant-based milk (2), made with a macauba pulp concentrate according to the invention | |
|---|---|
| Ingredient | Ingredient proportions (%) |
| Rapeseed oil | 1.00 |
| Sugar | 1.00 |
| Enzyme preparation | 0.03 |
| Total | 100.00 |

The milk preparation consisted of suspending macauba pulp concentrate in water at 50° C. until the dispersion looked homogeneous, followed by adding sugar. An enzyme preparation consisting of hemicellulases and pectinases was then added and the mixture was incubated at 50° C. for 1 hour. Then rapeseed oil was added and emulsified for 5 minutes at 21,000 rpm. The mixture was filtered using a sieve with an opening diameter of 125 μm and homogenised at 250 bar in the first stage and 50 bar in the second stage. Subsequently, the homogenised milk was pasteurised at 80° C. for 10 minutes and stored at 4° C.

The resulting plant-based milk had a pleasant taste, mouthfeel and stability. This plant-based milk had a more neutral taste and lower viscosity than the plant-based milk of Example 6.

SOURCES

1. Mudgil, D. and S. Barak, Composition, properties and health benefits of indigestible carbohydrate polymers as dietary fibre: a review. International journal of biological macromolecules, 2013. 61: p. 1-6.
2. Padayachee, A., et al., Complexity and health functionality of plant cell wall fibres from fruits and vegetables. Critical reviews in food science and nutrition, 2017. 57 (1): p. 59-81.
3. Cui, S. W. and Q. Wang, Cell wall polysaccharides in cereals: chemical structures and functional properties. Structural Chemistry, 2009. 20 (2): p. 291-297.
4. Lescano, C., et al., Nutrients content, characterization and oil extraction from *Acrocomia aculeata* (Jacq.) Lodd. fruits. African Journal of Food Science, 2015. 9 (3): p. 113-119.
5. Trentini C P, Oliveira D M, Zanette C M, Silva C. Low-pressure solvent extraction of oil from Macauba (*Acrocomia aculeata*) pulp: characterization of oil and defatted meal. Ciencia Rural, Santa Maria. 2016; 46(4): 725-731.
6. Silva A O, Cortez-Verga W R, Prentice C, Fonseca G G. Development and characterization of biopolymer films based on bocaiuva (*Acrocomia aculeata*) flour. International Journal of Biological Macromolecules. 2020; 155: 1157-1168.
7. Colombo C A, Berton L H C, Diaz B G, Ferrari R A. Macauba: a promising tropical palm for the production of vegetable oil. OCL. 2018; 25 (1): D108.
8. AOAC International. (2000). Method 991.43 Total dietary fibre. Enzymatic-gravimetric method. In Official methods of analysis of the association of official analytical chemists (edition 17th). Gaitherburg, MD, USA: Association of Official Analytical Chemists.
9. AOAC International. Method 968.06 Protein (crude) in animal feed. Dumas Method. In Official Methods of Analysis of the Association of Official Analytical Chemists, edition 15th; Association of Official Analytical Chemists: Arlington, VA, USA, 1990.
10. AOAC International. Method 979.09 Protein in grains. Official methods of analysis, 16th ed. Washington DC, USA: Association of Official Analytical Chemists, 1995. 109 p.
11. Pearce, K. N., Kinsella, J. E. Emulsifying properties of proteins: evaluation of a turbudimetric technique. Journal of Agricultural and Food Chemistry, v. 26, p. 716-723, 1978.
12. Wasche, A., Muller, K., Knauf, U., "New processing of lupin protein isolates and functional properties". Nahrung/Food, 2001, 45, 393-395
13. AOAC International. Method 920.39 Fat (crude) or Ether Extract. In Official Methods of Analysis of the Association of Official Analytical Chemists, edition 15th; Association of Official Analytical Chemists: Arlington, VA, USA, 1990.
14. German Food Act. (1980). Methods L.01.00-60, L. 16.01-2, L. 17.00-1, L. 17.00-3, 1980. In BVL Bundesamt fuer Verbraucherschutz and Lebensmittelsicherheit [Federal Office for Consumer Protection and Food Safety]. Berlin, Germany: Beuth Verlag GmbH. Official collection of methods of analysis according to § 64 Lebensmittel- und Futtermittelgesetzbuch (German Food and Feed Act, LFGB), § 35 vorläufiges Tabakgesetz (German Preliminary Tobacco Act, VTabakG) and § 28b GenTG-I-Lebensmittel Band I (L) [German Act on Genetic Engineering, Volume I, Foodstuffs] Methods for sample and inspecting foodstuffs.
15. AACC. Method 56-30. Approved methods of the aacc. 10th ed.; American Association of Cereal Chemists: St. Paul, MN, USA, 2000.
16. Muranyi I S, Otto C, Pickardt C, Osen R, Koehler P, Schweiggert-Weisz U. Influence of isolation method on the technofunctional properties of protein isolates from *Lupinus angustifolius* L. Journal of Food Science. 2016; 81 (11): C2656-C2663.

The invention claimed is:

1. Dietary fibre preparation that is produced from the flesh of macauba fruit and has
   a dietary fibre content of more than 25% by mass, determined according to an AOAC International reference method 991.43,
   a fat content lower than 20% by mass,
   a water content lower than 20% by mass, and
   a bright colour with a L* value, determined according to CIE-L*a*b* colorimetry, greater than 84,
   wherein a content of alcohol-water soluble substances in the dietary fibre preparation constitutes less than 40% relative to the mass of the preparation.

2. Dietary fibre preparation according to claim 1, characterized in that the content of alcohol-water soluble substances is less than 35% by mass.

3. Dietary fibre preparation according to claim 1, characterized in that the content of alcohol-water soluble substances is less than 20% by mass.

4. Dietary fibre preparation according to claim 1, characterized in that
   it has a fat content lower than 5% by mass.

5. Dietary fibre preparation according to claim 1, characterized in that
   it has a water content lower than 10% by mass.

6. Dietary fibre preparation according to claim 1, characterized in that
   it has a dietary fibre content of more than 40% by mass.

7. Dietary fibre preparation according to claim 1, characterized in that it has a shell content less than 10% by mass relative to dry substance.

8. Dietary fibre preparation according to claim 1, characterized in that it has a bright colour with a L*-value, determined according to CIE-L*a*b* colorimetry, higher than 90.

9. Dietary fibre preparation according to claim 1, characterized in that it has one or more of the following properties:

an emulsifying activity index of more than 35 $m^2$/g dry preparation, and/or an emulsion stability longer than 30 minutes, an emulsifying capacity of more than 400 mL/g dry preparation, a foaming activity of more than 200% by volume, and a foam stability of more than 25% by volume, a water binding capacity of more than 1.5 mL/g DS, and an oil binding capacity of more than 1.5 mL/g DS.

10. Dietary fibre preparation according to claim 1, characterized in that it has one or more of the following properties:

an emulsifying activity index of more than 25 $m^2$/g dry preparation, and/or an emulsion stability longer than 30 minutes, an emulsifying capacity of more than 300 mL/g dry preparation a foaming activity of more than 200% by volume, and a foam stability of more than 25% by volume, a water binding capacity of more than 1.5 mL/g DS, and an oil binding capacity of more than 1.5 mL/g DS.

11. An ingredient in foodstuff, a cosmetic or a pet food comprising the dietary fibre preparation of claim 1.

12. An emulsifier for paint and varnishes, a technical foaming agent, a technical film, a foil coating, an adhesive, a lubricant or a drilling fluid comprising the dietary fibre preparation of claim 1.

* * * * *